UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

KETONE AND PROCESS OF PRODUCING SAME.

1,114,735. Specification of Letters Patent. Patented Oct. 27, 1914.

No Drawing. Application filed July 14, 1913. Serial No. 778,884.

*To all whom it may concern:*

Be it known that I, ALEX B. DAVIS, a citizen of the United States, residing at Indianapolis, Marion county, and State of Indiana, have invented and discovered certain new and useful Improvements in Ketones and Processes of Producing Same, of which the following is a specification.

The invention relates to a new ketone derived from chlor-methyl-omega-brompropyl-carbinol by oxidation, which may be called chlor-methyl-omega-brom-propyl-ketone. It is a valuable intermediate product in the preparation of other compounds.

To prepare the ketone, chlor-methyl-omega-brom-propyl-carbinol, which is produced by the condensation of bromethyl-magnesium-bromid and epichlorhydrin, is added to sufficient potassium dichromate to burn off two atoms of hydrogen when sulfuric acid is added to the mixture in sufficient quantity to combine with all the potassium.

The process in detail may be carried out as follows: 157 parts by weight of chlor-methyl-omega-brom-propyl-carbinol to which may be ascribed the following formula:

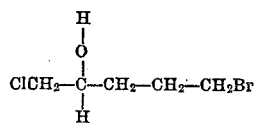

are placed in a flask and 80 parts of finely pulverized potassium dichromate added. The flask is then placed in a bath of cold water and 120 parts of sulfuric acid diluted with 150 parts of water are gradually run in. The oxidation takes place rapidly according to the following equation:

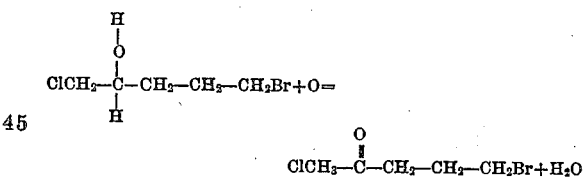

Much heat is evolved during the reaction and the temperature should not be allowed to exceed 50° as other by-products will be formed. When all the acid has been added the temperature is held at 50° or nearly so until all of the dichromate has dissolved. The flask is now heated for an hour on the water bath and then distilled with steam. The ketone is readily volatile with steam and passes over readily. When the distillate no longer has the sharp irritant odor of the ketone, the distillation is stopped, the total distillate extracted with ether as many times as necessary; the ether is evaporated and the residue distilled in vacuum when it boils at 94° C. under 20 m. m. pressure.

What I claim is:

1. A ketone of the formula:

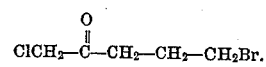

2. The process of producing a ketone by oxidizing a carbinol of the formula—

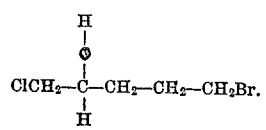

3. The process of producing a ketone by condensing bromethyl magnesium bromid and epichlorhydrin and subjecting the resulting carbinol to oxidation.

4. The process of producing a ketone which consists in condensing bromethyl-magnesium-bromid and epichlorhydrin, adding sufficient potassium dichromate to burn off two atoms of hydrogen and then adding sufficient sulfuric acid to combine with all the potassium.

5. The process of producing a ketone consisting in adding potassium dichromate to chlor-methyl-omega-brom-propyl-carbinol and then adding an acid capable of combining with the potassium.

6. The process of adding to chlor-methyl-omega-brom-propyl carbinol, a salt capable of burning off two atoms of hydrogen, then adding an acid suitable for combining with the positive element of the salt and to effect oxidation, maintaining the temperature during reaction at not more than 50° and then distilling the compound.

7. The process of producing a ketone which consists in adding potassium dichromate to chlor-methyl-omega-brompropyl-carbinol then adding sulfuric acid while the mixture is maintained at a comparatively low temperature, maintaining the temperature during reaction at not more than 50° and distilling off the ketone.

In witness whereof, I have hereunto set my hand and seal at Indianapolis, Indiana, this thirtieth day of June, A. D. nineteen hundred and thirteen.

ALEX B. DAVIS. [L. S.]

Witnesses:
 FRANK R. ELDRED,
 H. W. RHODEBAMEL.